J. F. GREY.
STEAM TURBINE.
APPLICATION FILED MAR. 29, 1921.
1,393,114.
Patented Oct. 11, 1921.
6 SHEETS—SHEET 1.
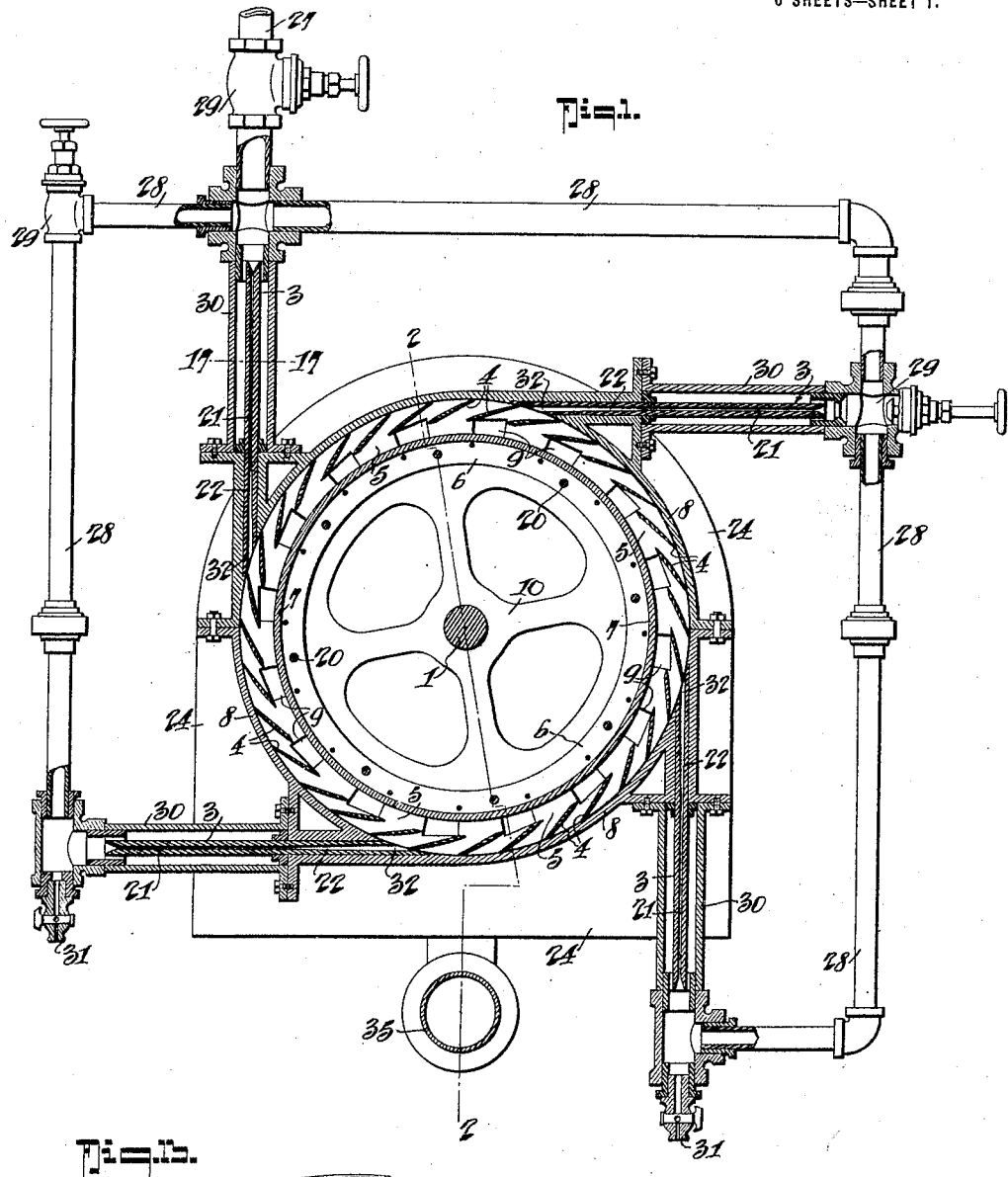
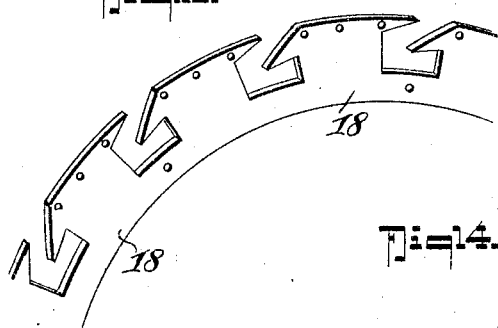
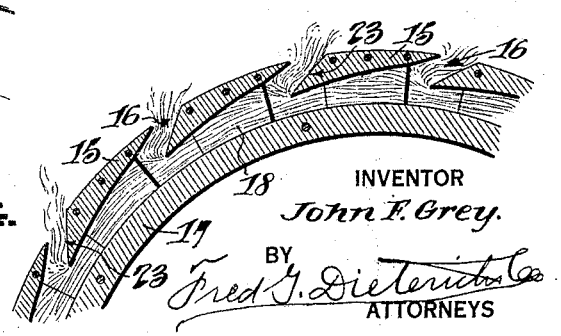
INVENTOR
John F. Grey.
BY
Fred G. Dieterich & Co.
ATTORNEYS

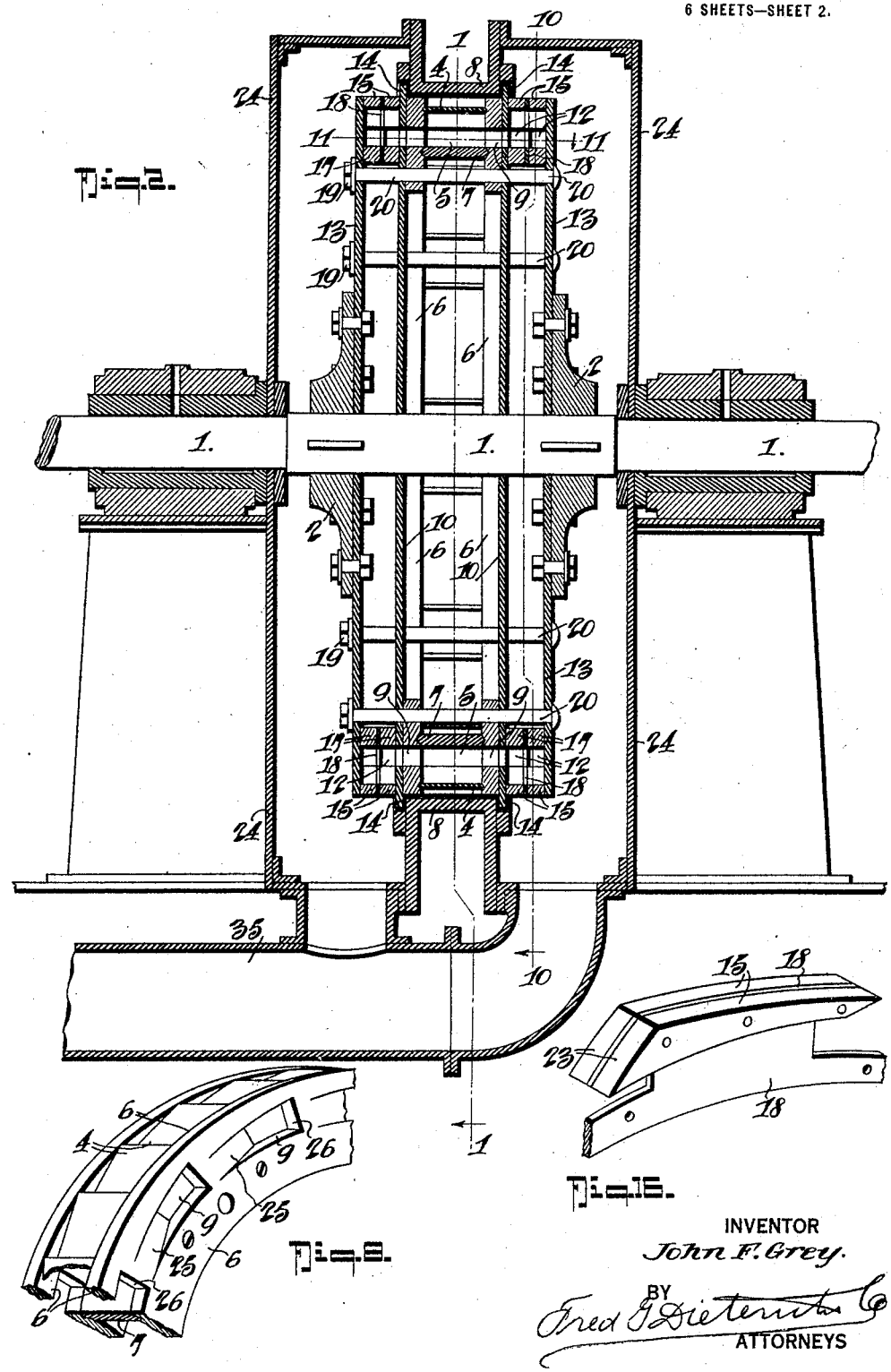

J. F. GREY.
STEAM TURBINE.
APPLICATION FILED MAR. 29, 1921.
1,393,114. Patented Oct. 11, 1921.
6 SHEETS—SHEET 3.
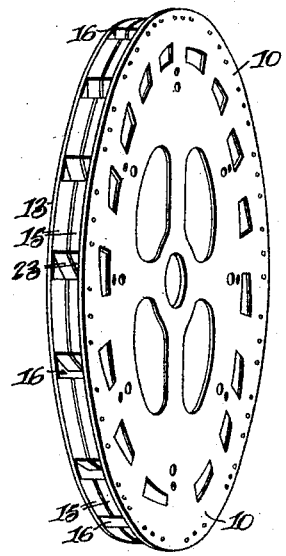
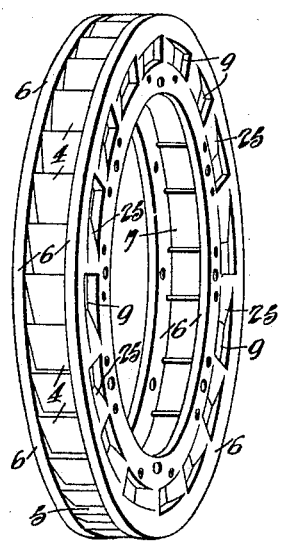
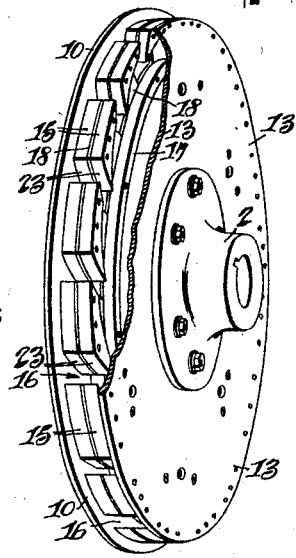
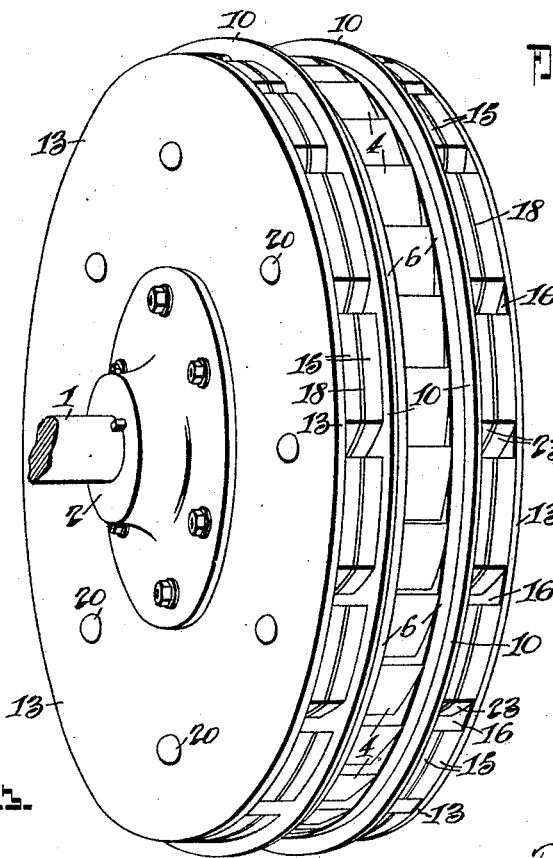
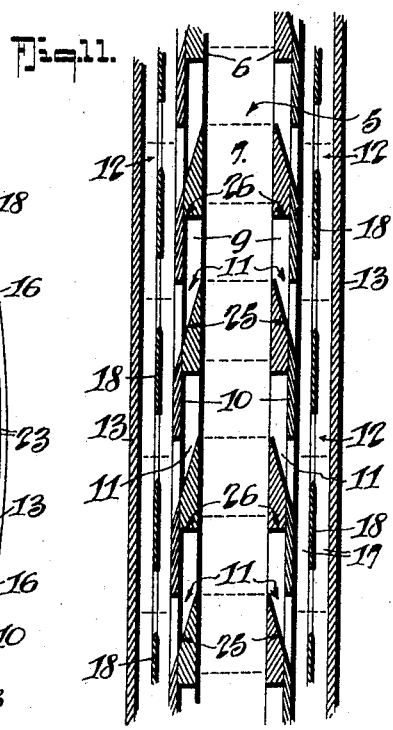
INVENTOR
John F. Grey.
BY
Fred G. Dieterich
ATTORNEYS

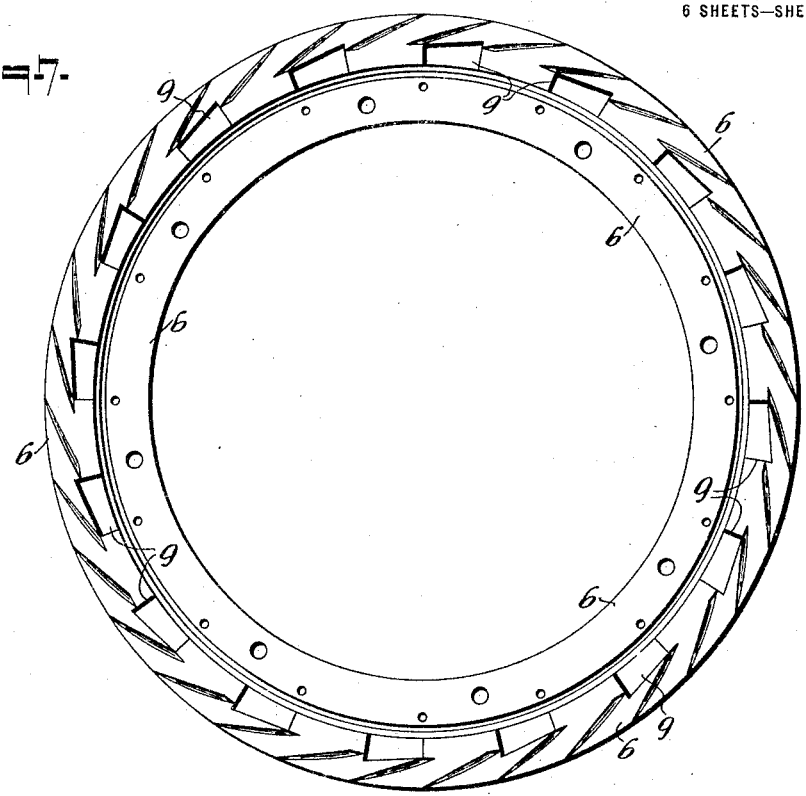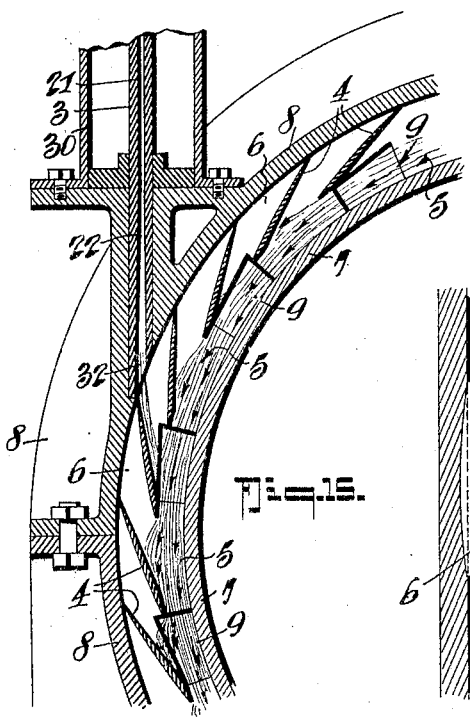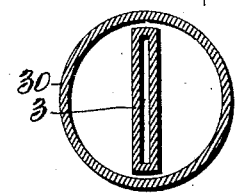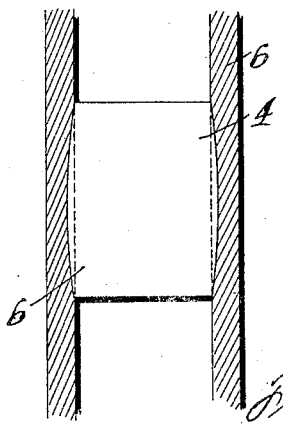

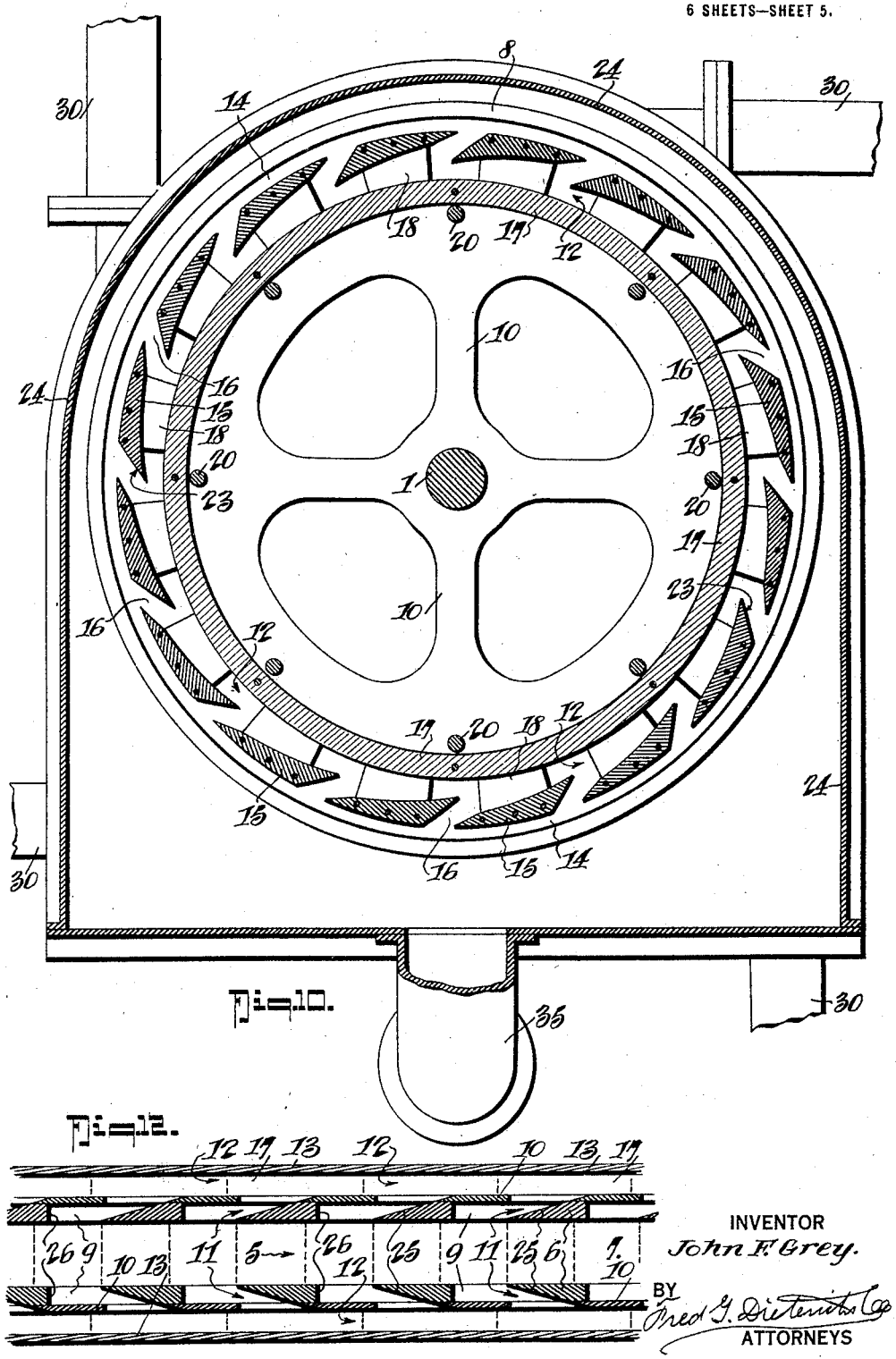

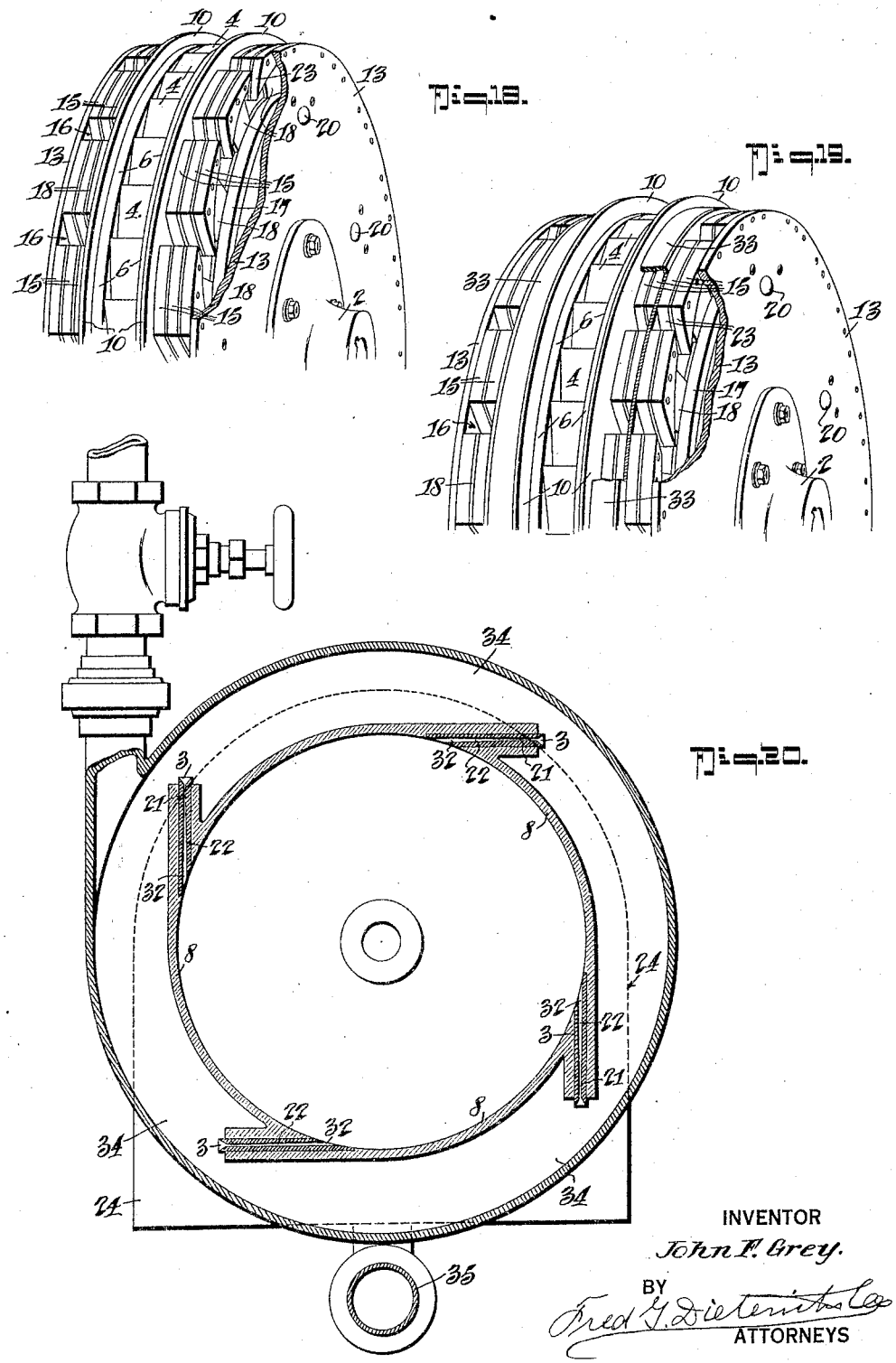

UNITED STATES PATENT OFFICE.

JOHN F. GREY, OF NEW ORLEANS, LOUISIANA.

STEAM-TURBINE.

1,393,114.   Specification of Letters Patent.   Patented Oct. 11, 1921.

Application filed March 29, 1921. Serial No. 456,716.

*To all whom it may concern:*

Be it known that I, JOHN F. GREY, a citizen of the United States, residing at New Orleans, in the parish of Orleans and State of Louisiana, have invented a new and Improved Steam-Turbine, of which the following is a specification.

In general this turbine is of a single wheel type with several compartments, in which the steam, introduced by suitably located nozzles, has a continuous forward whirl without a forward outlet, exhausting and relieving of back pressure resistance the front of the surfaces and blades acted upon by suction or molecular adhesion, utilizing in this manner both the momentum and pressure of the steam.

In the drawings—

Figure 1 is a central vertical section, parts being in elevation, taken substantially on the line 1—1 of Fig. 2.

Fig. 2 is a vertical longitudinal section taken substantially on the line 2—2 of Fig. 1.

Fig. 3 is a perspective view of the rotor.

Figs. 4, 5 and 6 are perspective views of the several units of the rotor separated.

Fig. 7 is an inside elevation of one of the rings of the central unit of the rotor.

Fig. 8 is an enlarged detail perspective view of a portion of the central unit.

Fig. 9 is a detail plan view of one of the blades of the central unit.

Fig. 10 is a vertical section on the line 10—10 of Fig. 2, looking in the direction of the arrow.

Fig. 11 is a detail developed section taken substantially on the line 11—11 of Fig. 2.

Fig. 12 is a detail view similar to Fig. 11 showing a modification in which the side units of the rotor are narrowed so as to make it unnecessary to the use the central shearing ring thereof.

Fig. 13 is a detail perspective view of a portion of one of the shearing rings.

Fig. 14 is a detail section showing the action and course of the steam in the channels of the outer unit of the rotor.

Fig. 15 is a detail view similar to Fig. 14 illustrating the action of the steam in the central or inlet channel.

Fig. 16 is a detail perspective view of one pair of the two part blade members of the outer unit of the rotor in proper position on the shearing ring.

Fig. 17 is a cross section on substantially the line 17—17 of Fig. 1.

Fig. 18 is a detail perspective view similar to Fig. 3 of a modified construction.

Fig. 19 is a detail perspective view similar to Fig 3 of a further modification.

Fig. 20 is a detail view similar to Fig. 1 of another modification.

In the drawings is illustrated a preferred embodiment of the invention and like numerals of reference designate like parts in all of the figures.

The invention comprises a rotor of several compartments or units firmly fastened together through the center of which passes a shaft 1 for transmission of the power, and to which the rotor is fastened at the hubs 2 which form the extreme ends of the rotor.

The rotor of the turbine receives steam from suitably located and specially designed nozzles 3, which will be further on more fully described; a casing 24 inclosing the rotor through which the nozzles penetrate, and to receive the exhauster steam to be led off to the atmosphere or a suitable condenser.

The rotor includes a central unit (Fig. 5) and side units (Figs. 4 and 6), each having a steam passage or channel.

The central compartment of the rotor constitutes the steam inlet compartment into which the steam issuing from the suitably located nozzles, in the central part of the casing 24 surrounding the central compartment of the rotor, enters successively between the inlet blades 4 into an annular channel 5 (formed by the annular side plates 6 of the central compartment, the interior surfaces of the inlet blades 4 and a cylindrical band 7 between the annular side plates which forms the bottom of the channel 5) through which the steam issuing from the nozzles circulates in a continuous whirl in the direction of the rotation of the rotor, glancing in its course from blade to blade, exhausting by suction the spaces between the outside surfaces of the inlet blades, and their inclosing central part of the casing 8 (see Fig. 15).

On the sides of this annular channel in the annular side plates of the central compartment of the rotor are ports or openings 9

(see Fig. 8) which together with the inner side plates 10 of the outer or side compartment of the rotor, form distributing channels 11 (see Fig. 11) through which the steam deflected laterally by the resistance encountered in glancing from blade to blade in the central annular channel 5, enters and distributes successively into the annular channels 12 of the outer or side compartments of the rotor, whirling in the direction of the rotation of the rotor.

The ports 9 have their advanced surfaces 25 inclined toward the sides or outlets of the openings, while their rear or following walls 26 are square across (see Fig. 11) so that the steam in passing through the channels 11 will cause a partial vacuum or suction in front of or adjacent to the surfaces 26 to avoid back pressure.

The outer or side compartments of the rotor, are each composed of two circular plates 10 and 13. On the outer plates 13 the hubs 2 are fastened, through which hubs the shaft passes and is fastened. The inner plates 10 are a little larger in diameter than the outer plates 13 so as to form small flanges 14 extending above the central compartment of the rotor, between which fits, with sufficient clearance for free rotation of the rotor, the central part 8 of the casing 24. Between the two side plates of each outer or side compartment of the rotor are peripheral blades 15 which together with the exhaust openings 16 form the periphery of these compartments of the rotor. Below the peripheral blades 15 and separated from their inner edges are cylindrical rings 17 or cylinders, which together with the side plates 10 and 13 and the peripheral blades 15 form the annular channels 12 of the outer or side compartments of the rotor, thereby allowing for a continuous forward whirl of the therein entering steam issuing with velocity from the distributing channels 11.

In order that the steam entering the annular channels may not be deflected at too great an angle in a lateral direction, when the channels 12 are wide in their construction, the annular channels 12 should have shearing disks 18 (see Fig. 11) before and somewhat in advance of the openings of the distributing channels 11. In this case, the peripheral blades 15 could each be formed in two longitudinal sections. Also the cylindrical rings which form the bottoms of the annular pressure channels should be preferably in two longitudinal sections (see Fig. 2) between which the shearing disks 18, which are shaped to conform to the contour of the blades, rings and channels (Fig. 13) are placed and riveted.

All the three compartments of the rotor are firmly held together by cross bolts 20 and nuts 19.

Through the central part of the casing, the nozzles 3, one or more, penetrate and are placed equally distant around the periphery of the rotor; their number depends on the size of the turbine.

The nozzles 3 are to be long when a high steam pressure is to be used, narrow in cross section, parallel with somewhat divergent inner portions 22 and a lateral width somewhat less than the space between the inlet blades, so as to admit an easy or free entrance of the steam between the blades into the central annular channel 5, the walls at the extreme inner ends of the nozzles being again parallel as at 32 (see Fig. 15).

When the turbine is to be run under a low pressure, the parallel part 21 of the nozzles should be correspondingly shorter so as to proportionately cut down the resistance in the nozzles to the passage of the steam.

The nozzles receive the supply of steam from the main 27 through lateral ducts 28 in which are shut off valves or control valves 29. The nozzles 3 are supported in casings 30 which may be in communication with the steam ducts 28, if desired, suitable drain cocks 31 being provided where desired.

All the expansion of the steam takes place in the nozzles and the steam should enter the rotor at nearly the pressure existing between the central part of the casing and the outer periphery of the central compartment of the rotor, where a partial vacuum is produced by the suction or molecular adhesion of the rapidly forward whirling steam in the annular inlet channel (see Fig. 15).

The momentum of the whirling steam causes a recompression of the steam, commencing in the distributing channels and reaching its greatest compression in the outer or pressure channels, where having no forward outlet, the steam is deflected backward through the openings 16 between the peripheral blades 15 (see Fig. 14) into the exhaust casing 24 and in the manner by which this is effected, relieves the front surfaces 23 of the peripheral blades of back pressure resistance by suction or molecular adhesion.

In its course through the distributing channels the steam, in its forward whirl in the rotor, also relieves the lateral partition surfaces in the distributing channels 11 of back pressure resistance by suction. The steam friction, except from the point on peripheral blades surface where the steam deflects backward into the exhaust casing, is in favor of the forward movement of the rotor.

As shown in Fig. 18, the channels can have more than one shearing disk 18 in each channel depending upon the width of the channels and the size of the rotor.

Furthermore there can be one or more additional channels between the central or inlet channel and the last side channels (see Fig. 19) with their corresponding side ports for steam distribution to the outer channels, this depending upon the velocity with which the steam is to enter the rotor and the size of the rotor.

In this case, these intermediate or pressure channels should have their peripheries closed in some suitable way, as for example by a ring or band 33; that is, they should have no peripheral outlet.

The steam connection with the nozzles shown in Fig. 1 is a preferred construction but, especially if short nozzles are to be used for low pressures, they can be arranged as shown in Fig. 20 to receive steam from a common compartment 34 inclosing the nozzles.

The turbine can be governed by any well known governor in present use and the exhaust steam may be led off from the exhaust casing to the exhaust pipe 35 into atmosphere or into a suitable condenser (not shown).

From the foregoing description taken in connection with the accompanying drawings, it is thought the complete construction, operation and advantages of my invention will be readily understood by those skilled in the art.

What I claim is:

1. In a rotary motor, a rotary drum having peripheral steam channels separated from one another by longitudinal partitions having passage ways through the same from one channel to the next adjacent channel, tangentially located blades in said channels and spaced with their inner edges free from the bottom of the channels to leave annular steam passage ways between the bottom of the channels and the blades, means to introduce steam into one of said channels, said blades being all arranged to direct the steam around the drum in one continuous direction, and a housing for the drum having provisions for the passage of exhaust fluid.

2. In a rotary motor, a rotary drum having peripheral steam channels separated from one another by longitudinal partitions having passageways through the same from one channel to the next adjacent channel, tangentially located blades in said channels and spaced with their inner edges free from the bottom of the channels to leave annular steam passage ways between the bottom of the channels and the blades, means to introduce steam into one of said channels, said blades being all arranged to direct the steam around the drum in one continuous direction, and a housing for the drum having provisions for the passage of exhaust fluid, and means for relieving the outer surface of the blades of back pressure resistance.

3. In a rotary motor, a rotating drum having a central peripheral annular inlet channel and additional channels at the sides of the inlet channel separated therefrom by partitions having steam passages for passing the steam from the central channel to the side channel, substantially tangentially disposed peripheral blades in the several channels, said blades having their inner or lower edges spaced from the bottom of the channels to leave annular steam passage ways around the drum between the bottom of the channels and the blades, means for directing a steam jet into the central channel between the blades in the general direction of the blades, a housing for the rotor having provision for inclosing the periphery of the central channel of the drum, and means for relieving the outer surface of the blades of back pressure resistance by suction or molecular cohesion.

4. In a rotary motor, a rotating drum having a central peripheral annular inlet channel and additional channels at the sides of the inlet channel separated therefrom by partitions having steam passages for passing the steam from the central channel to the side channel, substantially tangentially disposed peripheral blades in the several channels, said blades having their inner or lower edges spaced from the bottom of the channels to leave annular steam passage ways around the drum between the bottom of the channels and the blades, means for directing a steam jet between the blades into the inlet channel in the general direction of the blades, a housing for the rotor having provision for inclosing the periphery of the central channel of the drum, means for relieving the outer surface of the blades of back pressure resistance, and longitudinal fluid shearing partitions in some of said channels between the blades and the bottom surface of the channels, the same being located in advance or lead of the passages in the partitions.

5. In a rotary motor, a rotor comprising a shaft carrying a drum, the latter having a steam inlet annular channel and additional annular channels at the sides of the inlet channel, peripheral blades extending across the inlet channel and located a distance from the bottom wall of the channel, said blades being located approximately tangential to a circle drawn through their lower edges, similarly located blades in the additional channels, said drum having partitions between the several channels with openings from one channel to the adjacent channel, a housing in which the drum rotates, at least one steam introducing nozzle for delivering the steam into the inlet channel with velocity, and means for discharging the exhaust steam.

6. In a rotary motor, a rotor comprising a shaft carrying a drum, the latter having a steam inlet annular channel and additional annular channels at the sides of the inlet channel, peripheral blades extending across the inlet channel and located a distance from the bottom wall of the channel, said blades being located approximately tangential to a circle drawn through their lower edges, similarly located blades in the additional channels, said drum having partitions between the several channels with openings from one channel to the adjacent channel, a housing in which the drum rotates, at least one steam introducing nozzle for delivering the steam into the inlet channel with velocity and in a direction approximately tangential to a circle drawn through the lower edges of the blades and means for discharging the exhaust steam.

7. In a rotary motor, a housing, a drum within the housing having a peripheral annular inlet channel and a second set of channels separated by partitions from the inlet channel and having outlets, means inclosing the periphery of the inlet channel, blades in said channels, the lower edges of which blades are spaced a distance away from the bottom of the channels, said partitions having transverse steam passages, said blades being arranged in step formation, means to introduce steam into the inlet channel to pass through between the blades and annularly around the channel and laterally from one channel to the adjacent channel whereby to cause a continuous forward flow of steam around the drum from the intake to the outlet for the purpose described 8. In a rotary motor, a housing, a drum within the housing having a peripheral annular inlet channel and a second set of channels separated by partitions from the inlet channel and having outlets, means inclosing the periphery of the inlet channel, blades in said channels, the lower edges of which blades are spaced a distance away from the bottom of the channels, said partitions having transverse steam passages, said blades being arranged in step formation, means to introduce steam into the inlet channel to pass through between the blades and annularly around the channel and laterally from one channel to the adjacent channel whereby to cause a continuous forward flow of steam around the drum from the inlet to the outlet, and steam shearing plates in some of said channels and projected beneath the several blades for the purpose described.

9. In a rotary motor, a rotor, a casing within which said rotor operates, said rotor having annular steam circulating channels with steam directing blades arranged to cause a partial vacuum or suction at the outer surface of the blades, means for delivering steam into the inlet channel to circulate through the channels in a continuous forwarding direction.

10. In a rotary motor, a rotor, a casing within which said rotor operates, said rotor having annular steam circulating channels with steam directing blades arranged to cause a partial vacuum or suction at the outer surface of the blades, means for delivering steam into the inlet channel to circulate through the channels in a continuously forward direction, said delivering means comprising long nozzles of restricted cross section for receiving steam at boiler pressure.

11. In a rotary motor, a rotary drum having peripheral steam channels separated from one another by longitudinal partitions having passageways through the same from one channel to the next adjacent channel, tangentially located blades in said channels and spaced with their inner edges free from the bottom of the channels to leave annular steam passageways between the bottom of the channels and the blades, means to introduce steam into one of said channels, said blades being all arranged to direct the steam around the drum in one continuous direction, and a housing for the drum having provision for the passage of exhaust fluid, and means for relieving the outer surface of the blades of back pressure resistance by suction or molecular adhesion, said means comprising the stepping of the blades to cause the passing steam to produce a suction where the steam glances from one blade to the next.

12. In a steam turbine, a rotor having annular steam channels separated from one another by longitudinal partitions having ports through the same from one channel to the next adjacent channel, blades located in said channels and spaced with their inner edges free from the bottom of the channels to leave annular steam passages between the bottom of the channels and the blades, means to introduce steam into one of said channels, said blades and ports being all arranged and adapted to direct the steam around the drum and from channel to channel in one continuously forward direction until the pressure resistance in the channels deflect part of the steam backward and out to exhaust from the outer ends of the blades in the last channels through which the steam passes, and a housing for the rotor having provisions for the passage of exhaust fluid.

13. In steam turbines, a rotor comprising at least a central and two side units, each unit having an annular steam channel with peripheral blades in the channels, ducts between the respective units, the side units having exhaust outlets, means to admit steam into the central unit between the blades thereof, a housing for the rotor, and means for relieving the outer surface of the inlet blades of back pressure resistance.

14. In steam turbines, a rotor comprising a central and at least two side units having annular channels, said units including separating partitions having ports to pass the steam from the central channel to the side channels, peripheral blades in the central channel, means to pass steam into said central channel to whirl through the same in a circular path, peripheral blades in the side channels arranged to provide exhaust outlets between the blades at the periphery of the rotor, said channels being deeper than the blades to leave uninterrupted annular passages for the whirling steam.

15. In steam turbines, a rotor comprising a central and at least two side units having annular channels, said units including separating partitions having ports to pass the steam from the central channel to the side channels, peripheral blades in the central channel, means to pass steam into said central channel to whirl through the same in a circular path, peripheral blades in the side channels arranged to provide exhaust outlets between the blades at the periphery of the rotor, said channels being deeper than the blades to leave uninterrupted annular passages for the whirling steam, an annular casing band around the central unit to form a peripheral closure against the escape of steam.

16. In a turbine of the character stated, wherein is provided a rotor composed of units and means to deliver steam thereto; one of said units comprising a pair of side plates and an annular bottom ring and peripheral blades held between said side plates, the blades being wholly located a determined distance away from the bottom ring to leave an uninterrupted annular steam passage between the blades and the ring, said plates having steam ports leading from the said annular steam passage to adjacent units.

17. In a turbine of the character stated wherein is provided a rotor composed of units and means to deliver steam thereto; one of said units comprising a pair of side plates and an annular bottom ring and peripheral blades held between said side plates, the blades being wholly located a determined distance away from the bottom ring to leave an uninterrupted annular steam passage between the blades and the ring, said plates having steam ports leading from the said annular steam passage to adjacent units, and a housing for the rotor having a ring to form a peripheral steam escape closure for the unit into which steam is first admitted.

18. In a turbine of the character described in which is provided a housing inclosing a rotor, the latter being composed of a central and side units, and in which is provided means to deliver steam to the central units; one of said rotor units comprising side plates, a bottom ring, and peripheral blades held between said side plates, said blades being arranged to provide exhaust outlets and being wholly spaced away from said bottom ring to leave an uninterrupted annular steam circulating passage, one of said side plates having steam admission openings to said annular steam circulating passage.

19. In a turbine of the character described in which is provided a housing inclosing a rotor, the latter being composed of a central and side units, and in which is provided means to deliver steam to the central units; one of said rotor units comprising side plates, a bottom ring, and peripheral blades held between said side plates, said blades being arranged to provide exhaust outlets and being wholly spaced away from said bottom ring to leave an uninterrupted annular steam circulating passage, one of said side plates having steam admission openings to said annular steam circulating passage, said blades and ring being made in sections and at least one shearing partition located between said sections, said shearing partition having steam passages through the same.

20. In a steam turbine wherein is provided a housing inclosing a rotor and means to deliver steam to the rotor; said rotor comprising a central unit and at least a pair of side units, means securing said units together on a shaft; the central unit comprising a pair of annular side plates, a bottom ring and peripheral blades held between said side plates; said side units each comprising a pair of side plates with peripheral blades and a bottom ring held between the side plates, the said plates of the side units which are adjacent to the central unit and the side plates of the central units having steam ports, the leading or advance surfaces of said ports being in alinement while the rear or following surfaces of said ports are stepped one with relation to the other, said housing having a ring to encircle said central unit and close it off against peripheral steam passage.

21. In a steam turbine wherein is provided a housing inclosing a rotor and means to deliver steam to the rotor; said rotor comprising a central unit and at least a pair of side units, means securing said units together on a shaft; the central unit comprising a pair of annular side plates, a bottom ring and peripheral blades held between said side plates; said side units each comprising a pair of side plates with peripheral blades and a bottom ring held between the side plates, the said plates of the side units which are adjacent to the central unit and the side plates of the central unit having steam ports, the leading or advance surfaces of said ports being in alinement while the rear or following surfaces of said ports are stepped one with relation to the other, said housing having a ring to encircle said central unit and close it off against peripheral steam passage, and means for relieving the outer surfaces of the blades of back pressure resistance by suction or molecular cohesion.

22. In a steam turbine wherein is provided a housing inclosing a rotor and means to deliver steam to the rotor; said rotor comprising a central unit and at least a pair of side units, means securing said units together on a shaft; the central unit comprising a pair of annular side plates, a bottom ring and peripheral blades held between said side plates with the blades located wholly spaced away from said ring; said side units each comprising a pair of side plates with peripheral blades and a bottom ring held between the side plates, the said plates of the side units which are adjacent to the central unit and the side plates of the central unit having steam ports, the leading or advance surfaces of said ports being in alinement while the rear or following surfaces of said ports are stepped one with relation to the other, said housing having a ring to encircle said central unit and close it off against peripheral steam passage.

23. In a steam turbine, a rotor, a casing within which said rotor operates, said rotor having annular steam circulating channels with steam directing blades arranged to cause a partial vacuum or suction at the outer surface of the blades, nozzles of restricted cross section with their delivery end diverging, and adapted to receive steam at boiler pressure.

24. In a rotary motor, a rotary drum having peripheral steam channels separated from one another by longitudinal partitions having passage ways through the same from one channel to the next adjacent channel, tangentially located blades in said channels and spaced with their inner edges free from the bottom of the channels to leave annular steam passage ways between the bottom of the channels and the blades, means to introduce steam into one of said channels, said blades being all arranged to direct the steam around the drum in one continuous direction, and a housing for the drum having provisions for the passage of exhaust fluid, and means for relieving the outer surface of the blades of back pressure resistance, the blades of the last channel through which the steam passes having provision for deflecting steam backward and out to exhaust from the outer ends of the blades.

25. In a steam turbine, a casing, a rotor in the casing which includes an annular steam receiving channel, steam directing blades in said channel, a nozzle for delivering steam between said blades to said channel, said casing including a peripheral ring around said channel and said rotor having projecting flanges at the sides of said ring, and means permitting exhaust of the spent steam from the rotor.

26. In a rotary motor, a rotor comprising a shaft, a drum on the shaft having a fluid inlet channel, a set of pressure channels and a set of exhaust channels, peripheral blades for the inlet channel open at the periphery of the rotor and having their inner or lower edges separated from the bottom surface of said channels, peripheral blades forming the outer surface of said pressure channels, peripheral blades for the outer surface of the exhaust channels, a casing inclosing the rotor having an exhaust compartment to receive the exhaust fluid from the exhaust channels, steam introducing nozzles disposed with relation with the inlet channel to direct the steam between the blades of the inlet channel in a direction substantially parallel to the blades as they pass the nozzle opening, said rotor having partitions with passages from one channel to the next and means for relieving the front surface of the blades of back pressure resistance.

27. In a rotary motor, a rotor comprising a shaft, a drum on the shaft having a fluid inlet channel, a set of pressure channels and a set of reaction or exhaust channels, peripheral blades for the inlet channel, curved peripheral blades within the pressure channels and reaction channels, steam passages between the respective channels, and a casing inclosing the rotor and having an exhaust compartment to receive the exhaust steam from the reaction channels, and means for introducing steam into the inlet channel through the spaces between adjacent blades to pass around the inlet channel and from thence into and around successive pressure and exhaust channels.

28. In a rotary motor, a rotor comprising a shaft, a drum on the shaft having a fluid inlet channel, a set of pressure channels and a set of reaction or exhaust channels, peripheral blades for the inlet channel, curved peripheral blades within the pressure channels and reaction channels, steam passages between the respective channels, and a casing inclosing the rotor and having an exhaust compartment to receive the exhaust steam from the reaction channels, means for introducing steam into the inlet channel through the spaces between adjacent blades to pass around the inlet channel and from thence into and around successive pressure and exhaust channels, and means for relieving the front and outer surfaces of the blades of back pressure resistance by suction or molecular adhesion.

29. In a rotary motor, a rotor comprising a shaft, a drum on said shaft having a fluid inlet channel, a set of pressure channels and a set of reaction or exhaust channels, peripheral blades for the inlet channel, peripheral blades in step formation within the pressure channels and reaction channels, steam passages between the respective channels, a casing inclosing the rotor and having provision for receiving the exhaust steam from the reaction channels and means introducing steam into the inlet channel through the spaces between adjacent blades to pass around the inlet channel and from thence into and around successive pressure and exhaust channels.

JNO. F. GREY.